United States Patent [19]

Orikasa et al.

[11] Patent Number: 4,994,539

[45] Date of Patent: * Feb. 19, 1991

[54] METHOD FOR IMPROVING IMPULSE DESTRUCTIVE STENGTH OF ELECTRICAL INSULATING MATERIALS

[75] Inventors: Yuichi Orikasa; Shinji Kojima; Takashi Inoue, all of Yokohama; Kaoru Yamamoto; Atsushi Sato, both of Tokyo; Shigenobu Kawakami, Ichikawa, all of Japan

[73] Assignee: Nippon Petrochemicals Co., Ltd., Japan

[*] Notice: The portion of the term of this patent subsequent to Jan. 5, 2005 has been disclaimed.

[21] Appl. No.: 782,402

[22] Filed: Oct. 1, 1985

[30] Foreign Application Priority Data

Oct. 3, 1984 [JP] Japan .................................. 59-207595
Oct. 17, 1984 [JP] Japan .................................. 59-217924
Nov. 6, 1984 [JP] Japan .................................. 59-233950

[51] Int. Cl.$^5$ .............................................. C08F 18/16
[52] U.S. Cl. .................................. 576/326; 576/297.5; 576/293; 576/284; 576/347
[58] Field of Search ............ 526/293, 347, 326, 292.5, 526/284

[56] References Cited

U.S. PATENT DOCUMENTS

| | | | |
|---|---|---|---|
| 3,741,947 | 6/1973 | Schrott | 526/293 |
| 4,211,730 | 7/1980 | Vollkommer | 526/292.5 |
| 4,349,651 | 9/1982 | Smith | 526/284 |
| 4,717,759 | 1/1988 | Onikasa et al. | 526/326 |

Primary Examiner—Marion C. McCamish
Assistant Examiner—Christopher D. Rodee
Attorney, Agent, or Firm—Ostrolenk, Faber, Gerb & Soffen

[57] ABSTRACT

The present invention provides a method for improving impulse destructive strength of an electrical insulating material which is characterized by employing, as said electrical insulating material, an ethylene copolymer prepared by subjecting, to a high-pressure radical polymerization, ethylene or a mixture of ethylene and another monomer in the presence of at least one selected from the group consisting of one- to three-ring aromatic compounds (except styrene and substituted styrenes each having a single ring) each having one carbon-carbon double bond in one molecule, at a polymerization pressure of 500 to 4,000 kg/cm$^2$ at a polymerization temperature of 50° to 400° C, with said ethylene copolymer containing 0.005 to 1 mol % of a unit derived from said aromatic compound as a polymeric component.

20 Claims, 1 Drawing Sheet

FIG. 1

METHOD FOR IMPROVING IMPULSE DESTRUCTIVE STENGTH OF ELECTRICAL INSULATING MATERIALS

BACKGROUND OF THE INVENTION (1) Field of the Invention

The present invention relates to a method for sufficiently improving destructive strength to impulse voltage of electrical insulating materials.

(2) Description of the Prior Art

Heretofore, a variety of plastic materials have been used as electrical insulating materials for power cables and the like. Among others, olefin polymers are particularly good in electrical and mechanical properties, chemical stability and the like. Above all, low-density polyethylenes prepared by a high-pressure radical polymerization are inexpensive and have less dielectric loss and good workability. In addition thereto, these polyethylenes can be improved in their heat resistance when crosslinked, and in these polyethylenes, a tree phenomenon resulting from the contamination with foreign matters such as catalyst residues does not occur as often as in the case of a polyethylene prepared by ion polymerization. Having such many advantages, the low-density polyethylenes are utilized extensively as materials for electric wires and power cables.

A problem which is now present in such an insulating material for power cables is that the wall thickness of the material must be increased in proportion to a heightened voltage, when a higher transmission voltage is required in accordance with the augmentation of transmission capacity which can be supposed. For example, in the polyethylene materials which are now used, insulating breakdown will occur unless an insulating layer is thickened to an extreme degree in order to withstand the higher voltage.

For the solution of such a problem, various improved methods have been suggested. For example, some methods have been presented in which a graft polymerization of styrene and a polyethylene is made for the sake of improving destructive strength to impulse voltage particularly in a high-temperature area. One of these methods is disclosed in Japanese Patent Publication No. 18760/1979, but in this method disclosed, crosslinking of polyethylene must be carried out prior to or simultaneously with the graft polymerization of styrene and a molding method is thus limited, and there is a problem that its impulse strength decreases in a low-temperature section. Japanese Patent Provisional Publication No. 80605/1982 suggests a method in which ethylene polymer grains are impregnated and polymerized with an aromatic vinyl monomer in an aqueous suspension, but this method disadvantageously comprises very complicated processes.

Other methods have been further suggested in which a polyethylene or an olefin polymer is blended with an aromatic polymer such as a polystyrene (Japanese Patent Publication No. 20717/1963, and Japanese Patent Provisional Pulication Nos. 142651/1975 and 54187/1977), but miscibility between the polyethylene or the olefin polymer and the styrene polymer is bad disadvantageously.

Another suggested method comprises adding a block copolymer of styrene and a conjugated diene to a polyethylene (Japanese Patent Provisional Publication No. 41884/1977), but this method leads to the deterioration of heat resistance and extrusion workability.

Also, a method of impregnating a polyethylene with an electrical insulating oil has been suggested (Japanese Patent Provisional Publication No. 33938/1974), but in this method, the impregnated electrical insulating oil will bled out during a long-term storage or by changing ambient environments, so that an effect due to the oil will be impaired inconveniently.

SUMMARY OF THE INVENTION

As a result of intensive investigations to overcome the above-mentioned problems, the present invention has now been achieved. That is to say, an object of the present invention is to provide a method for increasing destructive strength to an impulse voltage of electrical insulating materials.

DETAILED DESCRIPTION OF THE INVENTION

The present invention is connected with a method for improving impulse destructive strength of an electrical insulating material comprising an ethylene copolymer which is prepared by subjecting, to a high-pressure radical polymerization, ethylene or a mixture of ethylene and another monomer in the presence of at least one member selected from the group consisting of one- to three-ring aromatic compounds (except styrene and a substituted styrene having a single ring) each having a carbon-carbon double bond in one molecule at a polymerization pressure of 500 to 4,000 kg/cm$^2$ polymerization temperature of 50° to 400° C, with the ethylene copolymer containing 0.005 to 1 mol % of a unit derived from the aromatic compound as a polymeric component.

Various one- to three-ring aromatic compounds each having one carbon-carbon double bond in one molecule can be preferably used, but in particular, aromatic hydrocarbon compounds are more preferable.

The usable typical compounds will be enumerated, but the present invention is not to be limited thereby.

First, typical examples of the aromatic hydrocarbon compounds each having one carbon-carbon double bond in one molecule and one benzene ring include compounds represented by the following general formulae (I) and (II):

General formula (I):

wherein $R_1$ is an alkylene group having 1 or 2 carbon atoms, $R_2$ is a hydrogen atom, a chlorine atom or an straight-chain or side-chain alkyl group having 1 to 4 carbon atoms, and n is an integer of 0 to 3.

Concrete compounds which can be represented by the above-mentioned formula (I) include allylbenzene, 4-phenyl-1-butene, allyltoluene, 4-tolylbutene-1, allyl-secbutylbenzene, chloroallylbenzene and the like.

General formual (II):

wherein $R_1$ is a hydrogen atom or a methyl group, $R_2$ is a hydrogen atom, a chlorine atom or a straight-chain or a side-chain alkyl group having 1 to 4 carbon atoms.

Concrete compounds which can be represented by the above-mentioned formula (II) include benzyl methacrylate, methylbenzyl methacrylate, chlorobenzyl methacrylate, benzyl acrylate, methylbenzyl acrylate, chlorobenzyl acrylate and the like.

Additionally, besides compounds having the formula (II), typical compounds include indenes such as indene and its derivatives, a $\beta$-substitued styrene such as $\beta$-methylstyrene, alkenylbenzene and its derivatives, arylcycloalkene such as phenylcyclohexene and its derivatives, and the like.

Derivatives of the compounds represented by the above-mentioned formulae (I) and (II) as well as $\beta$-substituted compounds of the excluded styrenes include compounds substituted by a halogen such as chlorine, and oxygen-containing derivatives having a methoxy group, a carboxyl group, a carbonyl group, an ether bond, an ester bond, a phenolic hydroxyl group and an alcoholic hydroxyl group, and derivatives having a sulfur atom and/or a nitrogen atom. Their concrete examples include methoxy-$\beta$-methylstyrene, chlorophenylcyclohexene, phenyl vinyl ether and the like.

The two-ring aromatic compounds having one carbon-carbon double bond in one molecule include condensed or non-condensed olefins each having two aromatic rings.

These olefins include cyclic olefin derivatives such as cyclopentene and cyclohexene and chain olefin derivatives, and they can be represented by the following general formulae (III) to (VI):

General formula (III):

wherein $R_1$ is an alkenylene group or a cycloalkenylene group having one unsaturated double bond, m and n each are an integer of 0 to 3, and $R_2$ and $R_3$ are identical or different and each of them is a hydrogen atom or an alkyl group.

General formula (IV):

wherein $R_4$ is an alkenyl group or a cycloalkenyl group, $R_5$ is an alkylene group or a cycloalkylene group, m and n each are an integer of 0 to 3, $R_2$ and $R_3$ are identical or different and each of them is a hydrogen atom or an alkyl group.

General formula (V):

wherein $R_4$ is an alkenyl group or a cycloalkenyl group, m and n each are an integer of 0 to 3, $R_2$ and $R_3$ are identical or different and ach of them is a hydrogen atom or an alkyl group.

General formula (VI):

$R_4$ is an alkenyl group or a cycloalkenyl group, m and n each are an integer of 0 to 3, $R_2$ and $R_3$ are identical or different and each of them is a hydrogen atom or an alkyl group.

The alkenylene group or the cycloalkenylene group represented by $R_1$ in the general formula (III) is a divalent substituent group obtained by removing two hydrogen atoms from ethylene, propylene, butene, isobutene, pentene, methylpentene, hexene, cyclopentene, cyclohexene or an alkylcyclohexene. The alkyl groups $R_2$ and $R_3$ are methyl, ethyl, propyl, isopropyl, n-butyl, isobutyl, sec-butyl, tertbutyl and amyl groups.

Concrete compounds represented by the general formula (III) include 1,1-diphenylethylene, 1,1-ditolylethylene, 1,1-dicumylethylene, 1,1-di(butylphenyl)ethylene, 1,1-di(chlorophenyl)ethylene, 1-phenyl-1-tolylethylene, 1,1-ditolylethylene, 1-phenyl-i-xylylethylene, 1-tolyl-1-xylylethylene, stilbene, 4-methylstilbene, 1,2-diphenylpropene, 1,3-diphenylpropene, 1,4-diphenylbutene-1, 1,4-diphenylbutene-2, 1,1-diphenylpropene-1, 2,3-diphenylpropene, 1,2-diphenylbutene-2, 1,3-diphenylbutene-1, 2,4-diphenyl-4-methylpentene-1, 2,4-diphenylbutene-1, 2,4-diphenylpentene-1, 2,4-ditolylbutene-1, 2,4-ditolylpentene-1, 2,4-ditolyl-4-methylpentene-1, 1,2-diphenylcyclohexene and phenylbenzylcyclohexene.

They can be prepared by a dimerization or a codimerization in the presence of an acid catalyst of a styrene such as styrene, $\alpha$-methylstyrene or vinyltoluene.

Stilbene and 1,2-diphenylpropene may be prepared by reacting benzaldehyde with benzylmagnesium bromide and then carrying out dehydration. Further, 1,1-diphenylethylene may be obtained by reacting diphenyl ketone with a Grignard reagent such as methylmagnesium iodide, followed by dehydration.

$R_4$ in the compounds represented by the general formula (IV) is an alkenyl group or a cycloalkenyl group such as vinyl, propenyl, isopropenyl, allyl, butenyl, cyclopentenyl or cyclohexenyl, and $R_5$ therein is a divalent substituent group obtained by removing two hydrogen atoms from a saturated alicyclic hydrocarbon such as a chain saturated aliphatic hydrocarbon, cyclopentane, cyclohexane or cycloheptane. Further, $R_2$ and $R_3$ therein which are alkyl groups are identical with $R_2$ and $R_3$ in the general formual (III).

Concrete examples of the compounds represented by the general formual (IV) include 1-phenyl-1-styrylethane, 1-tolyl-1-styrylethane, 1-phenyl-1-styrylpropane, 1-xylyl-1-styrylethane, 1-sec-butylphenyl-1-styrylethane, 1-chloropheynl-1-styrylethane, 1-phenyl-1-(4-vinylphenyl)ethane, 1-(4-methylphenyl-1-(4-vinylphenyl)ethane, 1-phenyl-1-(4-isopropenylphenyl)ethane, phenyl-(4-vinylphenyl)methane and phenyl(cyclohexenylphenyl)methane.

They can be prepared by a variety of chemical synthetic manners, and for example, phenyl-(vinylpheny)ethane may be prepared by reacting diphenylethane with acetyl chloride in the presence of a Friedel-Crafts catalyst to form phenyl(acetylphenyl)ethane, reducing the latter with sodium boron hydrine or the like, and dehydrating it. Phenyl(isopropenylphenyl)ethane can be prepared by reacting phenyl(formylphenyl)ethane with a Grignard reagent such as methylmagnesium iodide, and carrying out dehydration.

$R_4$ which is the alkenyl group or the cycloalkenyl group in the general formula (V) is identical with $R_4$ in the formula (IV), and $R_2$ and $R_3$ which are the alkyl groups also are the same as $R_2$ and $R_3$ in the formula (IV).

Concrete examples of the compounds represented by the general formula (V) include allylbiphenyl, vinylbiphenyl, 2-isopropenylbiphenyl, 4-isopropenylbiphenyl, 2-isopropenyl-4'-isopropylbiphenyl, cyclohexenylbiphenyl and cyclopentenylbiphenyl. Among others, for example, isopropenylbiphenyl can be prepared by dehydrogenating isopropylbiphenyl.

Moreover, $R_4$ which is the alkenyl group or the cycloalkenyl group in the general formula (VI) also is identical with $R_4$ in the formula (IV), and $R_2$ and $R_3$ which are the alkyl groups also are the same as $R_2$ and $R_3$ in the formula (IV).

Concrete examples of the compounds represented by the formula (VI) include α-vinylnaphthalene, isopropenylnaphthalene, allylnaphthalene and 1-cyclopent-2-enylnaphthalene. Of these compounds, for example, vinylnaphthalene can be prepared by reacting formylnaphthalene with a Grignard reagent such as methylmagnesium iodide and then dehydrating the resultant product.

Examples of further two-ring aromatic olefins include phenylbenzyl methacrylate, phenylbenzyl acrylate, arylindenes, aralkylindenes and acenaphthylenes.

Examples of the three-ring aromatic olefins include compounds represented by the following general formulae (VII) to (XI):

General formula (VII):

wherein $R_1$, $R_2$ and $R_3$ each are a hydrogen atom or an aliphatic hydrocarbon residue which has 1 to 4 carbon atoms and which may have an ethylenic double bond, l and m each are an integer of 0 to 3, and n is an integer of 0 to 2, but the total number of the ethylenic double bond which $R_1$, $R_2$ and $R_3$ have is 1.

Concrete examples of the compounds represented by the general formula (VII) include 1-vinylanthrasene, 2-vinylanthracene, 9-vinylanthracene, 2-isopropylanthracene and 9-propenyl-10-propylanthracene.

General formula (VIII):

wherein $R_1$, $R_2$ and $R_3$ each are a hydrogen atom or an aliphatic hydrocarbon residue which has 1 to 4 carbon atoms and which may have an ethylenic double bond, l and m each are an integer of 0 to 3, and n is an integer of 0 to 2, but the total number of the ethylenic double bond which $R_1$, $R_2$ and $R_3$ have is 1.

Concrete examples represented by the general formula (VIII) include 2-vinylphenanthrene, 3-isopropenylphenanthrene, 3-vinylphenanthrene and 9-vinylphenanthrene.

General formula (IX):

wherein $R_1$ is an aliphatic hydrocarbon residue which has 1 to 4 carbon atoms and which may have an ethylenic double bond, $R_2$ to $R_4$ each are a hydrogen atom or an aliphatic hydrocarbon residue which has 1 to 4 carbon atoms and which may have an ethylenic double bond, k is 0 or 1, l, m and n each are an integer of 0 to 3, but the total number of the ethylenic double bond which $R_2$, $R_3$ and $R_4$ have is 1.

Concrete examples of the compounds represented by the general formula (IX) include 1-phenyl-2-(1-naphthyl)ethylene, 1-phenyl-2-(2-naphthyl)ethylene, 1-phenyl-1-(1-naphthyl)ethylene, 1-phenyl-1-(2-naphthyl)ethylene, 1-phenyl-1-(1-naphthyl)propene, 1-phenyl-1-(2-naphthyl)propene, 1-phenyl-2-(2-naphthyl)propene and 1-(1-naphthyl)-2-o-tolylethylene.

General formula (X):

wherein $R_1$ and $R_2$ each are an aliphatic hydrocarbon residue which has 1 to 4 carbon atoms and which may have an ethylenic double bond, $R_3$ to $R_5$ each are a hydrogen atom or an aliphatic hydrocarbon residue which has 1 to 4 carbon atoms and which may have an ethylenic double bond, j and k each are 0 or 1, l, m and n each are an integer of 0 to 3, but the total number of the ethylenic double bond which $R_1$, $R_2$, $R_3$, $R_4$ and $R_5$ have is 1.

Concrete examples of the compounds represented by the general formula (X) include 2-phenylstilbene, 4-phenylstilbene, 1-phenyl-1-biphenylethylene, 4-benzylstilbene, 1-biphenyl-4-yl-1-p-tolylethylene, 1-biphenyl-4-yl-2-phenylpropene, 1-phenyl-2-(4-benzylphenyl)propene, 1-phenyl-1-(benzylphenyl)ethylene, 1-tolyl-1-

(benzylphenyl)ethylene and 1-phenyl-1-(phenylethylphenyl)ethylene.

General formula (XI):

wherein $R_1$ is an aliphatic hydrocarbon residue which has 1 to 4 carbon atoms and which may have an ethylenic double bond, $R_2$ to $R_4$ each are a hydrogen atom or an aliphatic hydrocarbon residue which has 1 to 4 carbon atoms and which may have an ethylenic double bond, l, m and n each are an integer of 0 to 3, but the total number of the ethylenic double bond which $R_1$, $R_2$, $R_3$ and $R_4$ have is 1.

Concrete examples of the compounds represented by the general formula (XI) include 1,1,2-triphenylethylene, 1,1,2-triphenylpropene, 1,1,3-triphenylbutene, 1,1-diphenyl-2-o-tolylethylene, 1,1-diphenyl-2-p-tolylethylene and 3,3,3-triphenylpropene-1.

The above-mentioned compounds exemplarily recited above are applicable to the manufacture of the electrical insulating materials according to the present invention, but are not intended to limit the scope of the present case at all.

These aromatic olefins can be prepared in various chemical synthetic manners, for example, by utilizing a Grignard reaction to form an alcohol and then dehydrating it.

For example, 1-phenyl-1-naphthylethylene may be prepared by reacting acetophenone with a Grignard reagent derived from bromonaphthalene to form 1-phenyl-1-naphthylethanol and then dehydrating the latter. Further, vinylanthracene may be obtained by reacting acetaldehyde with a Grignard reagent derived from bromoanthracene to form hydroxyethylanthracene and then dehydrating the latter.

Furthermore, the above-mentioned aromatic olefin may be manufactured by dehydrogenating a saturated aromatic hydrocarbon, i.e., an aromatic hydrocarbon having no ethylenic double bond.

That is to say, a method in which the dehydrogenation is employed comprises dehydrogenating a saturated aromatic hydrocarbon having 3 or more condensed or non-condensed aromatic rings in the presence of a suitable catalyst for the dehydrogenation. Additionally, a diolefin may be manufactured from a monoolefin. During the dehydrogenation, side reactions such as polymerization and the like should be inhibited, but in the case that the aromatic hydrocarbon having three condensed or non-condensed aromatic rings is produced, a side reaction such as a decomposition reaction may be allowed.

The catalysts for the dehydrogenation are not limited particularly, and optional catalysts can be employed. The usable catalysts include metallic oxides of Cr, Fe, Cu, K, Mg, Ca and the like; mixtures of two or more of these oxides; noble metals such as Pt and Pd; and catalysts in which these metallic oxides and noble metals are supported on carriers comprising alumina and the like.

Temperatures for the dehydrogenation reaction are within the range of 350° to 650° C, preferably 400° to 600° C. LHSV is within the range of 0.2 to 10, preferably 0.5 to 3.0. In dehydrogenating, water vapor and gases of nitrogen and hydrogen can be allowed to be present in its system for the purposes of lowering a partial pressure and preventing carbon from depositing. If desired, a suitable diluent may be used. However, raw materials themselves can usually behave as diluents conveniently, if a rate of the dehydrogenation to be achieved is not so high.

According to the above-mentioned dehydrogenation, vinylanthracene, phenylnaphthylethylene and phenylstibene can be prepared from ethylanthracene, phenylnaphthylethane and phenylbiphenylethane, respectively.

In addition to the examples give above, the three-ring aromatic olefins include diarylindenes, diaralkyl indenes and terphenyls.

Examples of the derivatives of the above-mentioned two- to three-ring aromatic olefins include derivatives substituted by halogens such as chlorine and bromine; oxygen-containing derivatives having methoxy, carboxyl, carbonyl, phenolic hydroxyl, alcoholic hydroxyl groups as well as ether and ester bonds; and derivatives having sulfur and nitrogen atoms.

Besides the above-mentioned aromatic olefins represented by the general formulae (IV) to (XI) and their derivatives, there can also be used aromatic compounds in which two- and three-ring aromatic units such as biphenyl, naphthalene, diarylalkanes, triarylalkanes, triaryldialkanes, anthracene, phenanthrene, arylnaphthalenes, alalkylnaphthalenes and terphenyl, and their derivatives are combined with groups each having one double bond such as unsaturated carboxylic acid:, for example, acrylic acid, methacrylic acid, maleic acid and fumaric acid as well as vinylesters.

When each of the above-mentioned various aromatic compounds is mixed with ethylene or another monomer containing ethylene as a main component and when the resultant mixture is subjected to a high-pressure radical polymerization to form a polymer, the aromatic compound will be contained, as a polymeric component, in a chain of the formed polymer. As apparent from the foregoing, each aforesaid aromatic compound has such a structural feature.

A polyethylene which has heretofore been used widely as an insulating material for power cables and the like will become poor in destructive strength to impulse voltage (impulse destructive strength), when its crystallinity is lowered, and it will also become bad in workability when its crystallinity is contrary heightened.

Generally, it is known that if a foreign component is introduced into the chain of the polyethylene, its crystallinity will deteriorate due to steric hindrance. The inventors of the present application, however, have found that if a unit derived from a specific aromatic compound is incorporated into the chain of the polymer in a proportion within a certain range, its impulse destructive strength will increase, though the crystallinity will decrease. The present invention is based on the unexpected fact that an improvement effect of the impulse destructive strength can be accomplished by introducing an extremely small amount of the aromatic unit into the ethylene polymer. This improvement effect can be perceived within an extensive range of from low temperatures to high temperatures, and in particular, the aforesaid effect is remarkable in the high temperatures.

The ethylene polymer of the present invention preferably has a crystallinity of 30% or more in accordance with X-ray diffraction, and a fall proportion of this crystallinity is restrained up to 25% of a drop in the crystallinity of an ethylene homopolymer having no aromatic ring prepared under substantially the same conditions as in the above ethylene polymer. An upper limit of the crystallinity is naturally fixed at a level of the crystallinity or less of the ethylene homopolymer obtained under substantially the same conditions as in the ethylene polymer. However, when the crystallinity of the ethylene polymer is less than 30%, its impulse destructive strength will be rather lower and its volume resistivity will also be lower, as compared with the ethylene homopolymer.

With regard to the unit derived from the above-mentioned aromatic compound which is to be contained in the ethylene polymer of the present invention as the polymeric component, its cortent is within the range of 0.005 to 1.0 mol %, preferably 0.01 to 0.7 mol %. When the content of the unit is less than 0.005 mol %, the improvement effect will scarcely be perceived. On the contrary, when it is in excess of 1.0 mol %, the impusle destructive strength will be rather poorer than the homopolymer in which the unit derived from the aromatic compound is not contained; an initiator for the high-pressure radical polymerization will be largely consumed and the expensive aromatic compound will be used in great quantities, which facts are not economical; and a chain transfer reaction will be vigorous and thus the molecular weight of the ethylene polymer will be remarkably lowered, so that a polymer unsuitable for the electrical insulating materials will be prepared.

A density of the ethylene polymer of the present invention preferably is within the range of 0.890 to 0.950 g/cm$^3$. Further, its melt index (hereinafter referred to as MI) preferably is within the range of 0.05 to 50 g/10 minutes, more preferably 0.1 to 20 g/10 minutes.

The ethylene polymer of the present invention can contain an unsaturated monomer other than the ethylene, and examples of such monomers include propylene, butene-1, pentene-1, hexene-1, 4-methylpentene-1, octene-1, decene-1, vinyl acetate, ethyl acrylate, methacrylic acid and its esters as well as their mixtures.

The content of the above-mentioned unsaturated monomer in the ethylene polymer preferably is within the range of 0 to 3 mol %, more preferably 1 mol % or less.

The ethylene polymer of the present invention may be mixed with an ethylene polymer not containing another aromatic unit. The composition with which another ethylene polymer is blended also is one of the preferable embodiments of the present invention, and so long as the content of the aromatic unit in the composition is in the range indicated above, the impulse destructive strength of the composition can be improved.

Examples of the other ethylene polymers which can be mixed with the ethylene polymer of the present invention include ethylene homopolymers; copolymers of ethylene and α-olefins each having 3 to 12 carbon atoms such as propylene, butene-1, pentene-1, hexene-1, 4-methylpentene-1, octene-1 and decene-1; copolymers of ethylene and polar group-containing monomers such as vinyl acetate, acrylic acid, ethyl acrylate, methacrylic acid, ethyl methacrylate, maleic acid and maleic anhydride; polymers prepared by modifying the ethylene homopolymers or copolymers of ethylene and α-olefins with unsaturated carboxylic acids such as acrylic acid, maleic acid and their derivatives; and their mixtures.

The ethylene polymer of the present invention may be manufactured by a radical polymerization under a high pressure. Here, the radical polymerization under a high pressure just referred to means a method which comprises contacting and polymerizing ethylene, an aromatic compound, and if desired, another monomer simultaneously or stepwise at a polymerization pressure of 500 to 4,000 kg/cm$^2$, preferably 1,000 to 3,500 kg/cm$^2$ at a reaction temperature of 50° to 400° C, preferably 100° to 350° C in the presence of a free radical catalyst, a chain transfer agent, and if desired, assistants in an autoclave type or a tube type reactor. When the aromatic compound is solid, it may be dissolved in a suitable solvent and then fed to the reactor.

Examples of the above-mentioned free radical catalysts include usual initiators such as peroxides, hydroperoxides, azo-compounds, amine oxide compounds and oxygen.

Further, examples of the chain transfer agents include hydrogen; propylene; butene-1; saturated aliphatic hydrocarbons having 1 to 20 or more carbon atoms and hydrocarbons substituted by a halogen, for example, methane, ethane, propane, butane, isobutane, n-hexane, n-heptane, cycloparaffins, chloroform and carbon tetrachloride; saturated aliphatic alcohols having 1 to 20 or more carbon atoms, for example, methanol, ethanol, propanol and isopropanol; saturated aliphatic carbonyl compounds having 1 to 20 or more carbon atoms, for example, acetone and methyl ethyl ketone; and aromatic compounds other than mentioned above, for example, toluene, diethylbenzene and xylene.

The ethylene polymer or the ethylene polymer composition containing another ethylene polymer, which can be manufactured as just described, can exhibit excellent insulating properties, when used as an electrical insulating material, and in particular, it has a good destructive strength to impulse voltage in a high-temperature zone. Therefore, the polymer of the present invention is very useful as insulating materials for extra-high voltage power cables.

Further, the polymer of the present invention can be prepared in accordance with a relatively simple process which is a high-pressure radical polymerization, and this process does not require intricate graft and blending steps, which fact also is very convenient.

To the ethylene polymer or the ethylene polymer composition of the present invention, other compounds may be added, so long as its properties are not impaired remarkably, and examples of such addable compounds include olefin polymers (inclusive of copolymers) except for the above-mentioned other ethylene polymers; thermoplastic resins such as polyacrylonitriles, polyamides, polycarbonates, ABS resins, polystyrenes, polyphenylene oxides, polyvinyl alcohol resins, vinyl chloride resins, vinylidene chloride resins and polyester resins; petroleum resins; cumarone-indene resins; synthetic rubbers such as ethylene-propylene copolymer rubbers (EPR, EPDM and the like), SBR, NBR, butadiene rubber, IIR, chloroprene rubber, isoprene rubber, styrene-butadiene-styrene block copolymers; and natural rubbers. These compunds may be used alone or in a combination thereof.

Furthermore, in the present invention, additives may be added thereto so long as the effects of the present case are not damaged remarkably, and examples of such additives include organic and inorganic fillers, an antioxidant, a lubricant, organic and inorganic various pigments, an ultraviolet stabilizer, a dispersant, a copper de-activator, a neutralizer, a blowing agent, a plasticizer, a foam inhibitor, a flame retarder, a crosslinking agent, an improver for flow properties, an improver for weld strength and a nucleating agent.

The ethylene polymer or the composition containing it, which is concerned with the present invention, may be used in an uncrosslinking state, or if desired, it may be employed after crosslinked. Such a crosslinking treatment may be carried out in a usual crosslinking manner.

Now, the present invention will be described in detail in reference to examples.

EXAMPLES 1 TO 14

About 1,700 g of ethylene, each single-ring aromatic compound shown in Table 1 and a predetermined amount of n-hexane were placed in a 3.8-liter metallic autoclave type reactor equipped with a stirrer in which an atmosphere had previously been replaced sufficiently with nitrogen and ethylene, and di-tertiary-butyl peroxide which was a polymerization initiator was then added thereto. Polymerization was afterward carried out at a polymerization temperature of 170° C at a polymerization pressure of 1,600 kg/cm² for 60 minutes in order to prepare each ethylene polymer containing a unit derived from an aromatic compound set forth in Table 1.

A portion of each produced polymer was dissolved in heated carbon tetrachloride and was then poured into a large amount of acetone to precipitate it again. This procedure was repeated several times to refine the polymer and the latter was then vacuum-dried.

The refined and dried polymer was molded into a sheet having a thickness of 500 μm by virtue of a heating compression operation, and the unit derived from the aromatic compound in each polymer thus produced was determined quantitatively by an infrared spectrophotometry on the basis of a compensation method of using a control sheet which was composed of an ethylene polymer not containing any aromatic compound and which had the same thickness.

The quantitative analysis of the unit derived from the aromatic compound contained in each produced polymer was carried out by the utilization of absorbance which was mainly based on aromatic rings in the vicinity of 1,600 cm⁻¹. Further, melt index of each produced polymer was measured in accordance with JIS K-6760.

For the respective produced polymers, impulse destructive strength was measured at 20° C and 80° C, and the results are set forth in Table 1

COMPARATIVE EXAMPLE 1

The procedure of Example 1 was repeated to produce an ethylene homopolymer, and for the latter, impulse destructive strength was measured in the same manner as in Example 1. The results are set forth in Table 1.

COMPARATIVE EXAMPLES 2 TO 7

The procedure of Example 1 was repeated to prepare ethylene copolymers shown in Table 1, and impulse destructive strength was measured. The results are set forth in Table 1.

EXAMPLES 15 to 16

The procedure of Example 1 was repeated to prepare ethylene-allylbenzene copolymer and ethylene-benzyl methacrylate copolymer in which each content of allylbenzene and benzyl methacrylate was 4 mol %. With 5.5 parts by weight of the ethylene copolymer were mixed 94.5 parts by weight of the low-density polyethylene used in Comparative Example 1 with the aid of a plastograph in order to prepare an ethylene copolymer composition containing 0.2 mol % of allylbenzene and benzyl methacrylate. Table 1 sets forth the results of measured impulse destructive strength of the thus prepared ethylene copolymer composition.

Evaluation

The results in Table 1 indicate that Examples 1 to 14 regarding the present invention were more excellent in destructive strength than the conventional high-pressure low-density polyethylene (Comparative Example 1) particularly in the high-temperature condition.

As understood from the results of Examples 15 and 16, the ethylene copolymer composition was provided with the improvement effect, when the contents of allylbenzene and benzyl methacrylate were within the certain range of the present invention.

On the other hand, in Comparative Examples 2 to 7 in which the contents of allylbenzene, benzyl methacrylate and indene deviated from the specified range of the present invention, any effect of the improvement was not perceived.

Figure 1:
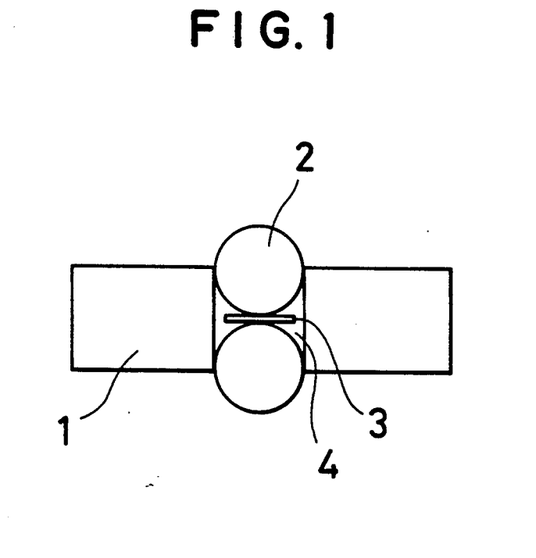
FIG. 1 is a schematic side view illustrating a electrode for an impulse destructive test in the present invention.

The impulse destructive strength test was carried out in the following manner: As an electrode system, there was used a so-called Mckeowr electrode (FIG. 1) which was a kind of stationary electrode. A base plate 1 of the electrode system was made of polymethyl methacrylate and was provided at its central portion with a hole having a diameter of ½ inch. Used electrodes 2, 2 were stainless steel balls each having a diameter of ½ inch. An about 8 mm × 10 mm sample 3 was interposed between the electrodes 2, 2. Spaces between the sample 3 and the electrodes 2, 2 were packed with a deaerated epoxy resin 4, and the latter was then cured. The thus constructed Mckeown electrode was dipped in a vessel filled with silicone oil and was then placed in a thermostat, and measurement was carried out. A waveform used for the destruction was 1×40 μS negative impusle waveform. The waveform was observed by means of an oscilloscope, and data were collected on the basis of the destruction at its wave front and average values of 20 points or more were taken.

TABLE 1

| | Aromatic compound | | Amount of produced polymer (g) | Melt index (g/ 10 min) | Content of unit derived from aromatic compound (mol %) | Impulse breaking strength (MV/cm) | | Crystallinity by X-ray diffraction (%) |
|---|---|---|---|---|---|---|---|---|
| | Name | Amount (g) | | | | 20° C | 80° C | |
| Example 1 | Allylbenzene | 60 | 110 | 2.8 | 0.5 | 6.23 | 4.58 | 47 |
| Example 2 | Allylbenzene | 10 | 152 | 3.0 | 0.1 | 6.25 | 4.61 | 52 |

TABLE 1-continued

|  | Aromatic compound | | Amount of produced polymer (g) | Melt index (g/ 10 min) | Content of unit derived from aromatic compound (mol %) | Impulse breaking strength (MV/cm) | | Crystallinity by X-ray diffraction (%) |
| --- | --- | --- | --- | --- | --- | --- | --- | --- |
|  | Name | Amount (g) |  |  |  | 20° C | 80° C |  |
| Example 3 | Allylbenzene | 20 | 146 | 3.0 | 0.2 | 6.21 | 4.56 | 49 |
| Example 4 | 4-Phenyl-1-butene | 20 | 167 | 2.6 | 0.2 | 6.19 | 4.53 | 50 |
| Example 5 | Benzyl methacrylate | 20 | 320 | 3.0 | 0.5 | 6.15 | 4.50 | 46 |
| Example 6 | Benzyl methacrylate | 3 | 307 | 3.0 | 0.1 | 6.18 | 4.52 | 50 |
| Example 7 | Benzyl methacrylate | 6 | 300 | 3.1 | 0.2 | 6.18 | 4.50 | 48 |
| Example 8 | Benzyl acrylate | 6 | 295 | 2.8 | 0.2 | 6.18 | 4.49 | 48 |
| Example 9 | Indene | 10 | 306 | 3.7 | 0.08 | 6.03 | 4.29 | 50 |
| Example 10 | β-Methyl styrene | 70 | 121 | 2.6 | 0.11 | 6.15 | 4.37 | 50 |
| Example 11 | Phenylcyclohexene | 130 | 139 | 1.4 | 0.08 | 6.28 | 4.41 | 49 |
| Example 12 | Methoxy-β-methylstyrene | 100 | 107 | 5.6 | 0.11 | 6.09 | 4.29 | 49 |
| Example 13 | Chlorophenyl-cyclohexene | 160 | 125 | 3.7 | 0.09 | 6.13 | 4.26 | 49 |
| Example 14 | Phenyl vinyl ether | 10 | 92 | 1.9 | 0.10 | 6.09 | 4.00 | 50 |
| Com. Ex. 1 | — | — | 164 | 3.0 | 0.00 | 6.03 | 3.50 | 57 |
| Comp. Ex. 2 | Allylbenzene | 0.2 | 331 | 2.7 | 0.001 | 6.02 | 3.50 | 56 |
| Comp. Ex. 3 | Allylbenzene | 200 | 70 | 2.9 | 2.0 | 5.94 | 3.35 | 38 |
| Comp. Ex. 4 | Benzyl methacrylate | 0.02 | 261 | 3.0 | 0.001 | 6.03 | 3.51 | 56 |
| Comp. Ex. 5 | Benzyl methacrylate | 60 | 269 | 3.0 | 2.0 | 5.91 | 3.30 | 37 |
| Comp. Ex. 6 | Indene | 0.3 | 252 | 2.6 | 0.002 | 6.03 | 3.37 | 55 |
| Comp. Ex. 7 | Indene | 150 | 25 | 280 | 1.2 | 5.26 | 2.69 | 39 |
| Example 15 | $C_2'$-Allyl-benzene + LDPE | — | — | 2.8 | 0.2 | 6.14 | 4.47 | 49 |
| Example 16 | $C_2'$-Benzyl-methacrylate + LDPE | — | — | 3.1 | 0.2 | 6.11 | 4.42 | 48 |

EXAMPLES 17 TO 27

About 1,700 g of ethylene, each of two- and three-ring aromatic compounds shown in Table 2 and a predetermined amount of n-hexane were placed in a 3.8-liter metallic autoclave type reactor equipped with a stirrer in which an atmosphere had previously been replaced sufficiently with nitrogen and ethylene, and di-tertiary-butyl peroxide which was a polymerization initiator was then added thereto. Polymerization was carried out at a polymerization temperature of 170° C at a polymerization pressure of 1,600 kg/cm² for 60 minutes in order to prepare each ethylene polymer containing a unit derived from an aromatic compound set forth in Table 1.

A portion of each produced polymer was dissolved in heated carbon tetrachloride and was then poured into a large amount of acetone to precipitate it again. This procedure was repeated several times to refine the polymer and the latter was then vacuum-dried.

The refined and dried polymer was molded into a sheet having a thickness of 500 μm by virtue of a heating compression operation, and the unit derived from the aromatic compound in each polymer thus produced was determined quantitatively by an infrared spectrophotometry on the basis of a compensation method of using a control sheet which was composed of an ethylene polymer not containing any aromatic compound and which has the same thickness.

The quantitative analysis of the unit derived from the aromatic compound contained in each produced polymer was carried out by the utilization of absorbance which was mainly based on the aromatic ring in the vicinity of 1,600 cm$^{-1}$. Further, melt index of each produced polymer was measured in accordance with JIS K-6760.

For the respective produced polymers, impulse destructive strength was meausred at 20° C and 80° C, and the results are set forth in Table 2.

COMPARATIVE EXAMPLES 8 TO 10

The procedure of Example 17 was repeated to produce ethylene polymers shown in Table 2, and for the latter, impulse destructive strength was measured. The results are set forth in Table 2.

Evaluation

The results in Table 2 indicate that Examples 17 to 27 regarding the present invention were more excellent in destructive strength than the ethylene homopolymer (Comparative Example 8) particularly in the high-temperature condition.

On the other hand, in Comparative Examples 9 and 10 in which the content of the aromatic compound deviated from the specified range of the present invention, any effect of the improvement was not perceived.

TABLE 2

| | Aromatic compound Name | Amount (g) | Amount of produced polymer (g) | Melt index (g/10 min) | Content of unit derived from aromatic compound (mol %) | Impulse breaking strength (MV/cm) 20° C | Impulse breaking strength (MV/cm) 80° C | Crystallinity by X-ray diffraction (%) |
|---|---|---|---|---|---|---|---|---|
| Example 17 | Allylbiphenyl | 60 | 32 | 2.9 | 0.2 | 6.21 | 4.55 | 47 |
| Example 18 | 1,1-Diphenylethylene | 5 | 105 | 3.1 | 0.2 | 6.23 | 4.53 | 47 |
| Example 19 | 1-Phenyl-1-styrylethane | 5 | 147 | 3.0 | 0.2 | 6.20 | 4.52 | 47 |
| Example 20 | 2,4-Diphenyl-4-methylpentene-1 | 80 | 109 | 2.9 | 0.2 | 6.22 | 4.51 | 46 |
| Example 21 | Phenylbenzyl methacrylate | 12 | 272 | 2.9 | 0.2 | 6.14 | 4.49 | 47 |
| Example 22 | Phenylbenzyl acrylate | 12 | 260 | 3.0 | 0.2 | 6.15 | 4.47 | 47 |
| Example 23 | Isopropenyl-biphenyl | 5 | 108 | 3.1 | 0.03 | 6.18 | 4.26 | 50 |
| Example 24 | Isopropenyl-biphenyl | 8 | 70 | 4.1 | 0.08 | 6.09 | 4.32 | 49 |
| Example 25 | β-Vinylnaphthalene | 10 | 156 | 2.9 | 0.04 | 6.17 | 4.00 | 49 |
| Example 26 | Phenylisopropenyl-phenylmethane | 10 | 105 | 3.5 | 0.08 | 6.20 | 4.25 | 48 |
| Example 27 | 9-Vinylanthracene | 20 | 97 | 1.7 | 0.02 | 6.04 | 3.99 | 48 |
| Comp. Ex. 8 | — | — | 164 | 3.0 | 0.000 | 6.03 | 3.50 | 57 |
| Comp. Ex. 9 | Isopropenyl-biphenyl | 0.5 | 170 | 2.8 | 0.002 | 6.00 | 3.60 | 55 |
| Comp. Ex. 10 | Isopropenyl-biphenyl | 20 | 11 | 9.6 | 1.2 | 5.87 | 3.30 | 37 |

COMPARATIVE EXAMPLES 11 AND 12

The procedure of Example 1 was repeated with the exception that the polymerization temperature of 170° C was replaced with 230° C, the polymerization pressure of 1,600 kg/cm² with 1,000 kg/cm², and the modifier of n-hexane with propylene, in order to prepare an ethylene copolymer having a low crystallinity. Afterward, an impulse destructive test was carried out in the same manner as in Example 1, and the results of the test are set forth in Table 3.

As be apparent from the results in Table 3, with regard to the products in which the crystallinity was less than 30%, any improvement of the impulse destructive strength was not perceived.

TABLE 3

| | Aromatic compound Name | Conc. (mol %) | Content of unit [1] (mol %) | MI (g/10 min) | C[2] (%) | Impulse breaking strength (MV/cm) 20° C | Impulse breaking strength (MV/cm) 80° C |
|---|---|---|---|---|---|---|---|
| Comp. Ex. 11 | Allyl-benzne | 1.2 | 0.6 | 3.0 | 28 | 6.02 | 3.34 |
| Comp. Ex. 12 | Benzyl methacryrate | 0.2 | 0.6 | 2.8 | 27 | 6.01 | 3.32 |

[1]Content of the unit having an aromatic ring in the ethylene polymer.
[2]Crystallinity through X-ray diffraction.

What is claimed is:

1. In a method of insulating an electrical conductor the improvement which comrpises employing, as said electrical insulating material, an ethylene copolymer prepared by subjecting, to a high pressure radical polymerization, ehtylene and an aromatic compound, at a polymerization pressure of 500 to 4,000 kg/cm² and a polymerization temperature of 50° to 400° C, said ethylene copolyme containing 0.005 to 1 mol % of a unit derived from said aromatic compound as a polymeric component, said aromatic compound selected from the group consisting of allyl benzene, phenylbutene, benzyl methacrylate, benzylacrylate, indene, beta-methyl styrene, phenylcyclohexene, methoxybeta-methyl styrene, chlorophenyl cyclohexene, phenylvinyl ether, allylbiphenyl, diphenylethylene, phenyl styrylethane, diphenyl methylpentene, phenylbenzyl methacrylate, phenylbenzylacrylate, isopropenyl biphenyl, vinyl naphthalene, phenylisopropenyl phenylmethane and vinylanthracene.

2. A method according to claim 1 wherein said aromatic compound is an aromatic hydrocarbon.

3. A method according to claim 1 wherein said aromatic compound is selected from the group consisting of:
   allyl benzene,
   phenylbutene,
   benzyl methacrylate,
   benzylacrylate,
   indene,
   beta-methyl styrene,
   phenylcyclohexene,
   methoxybeta-methyl styrene,
   chlorophenyl cyclohexene and
   phenylvinyl ether.

4. A method according to claim 1 wherein said aromatic compound is selected from the group consisting of:

allylbiphenyl,
diphenylethylene,
phenyl styrylethane,
diphenyl methylpentene,
phenyl methylpentene,
phenylbenzyl methacrylate,
phenylbenzylacrylate,
isopropenyl biphenyl,
vinyl naphthalene,
phenylisopropenyl phenylmethane and
vinylanthracene.

5. A method according to claim 1 wherein said ethylene copolymer has a crystallinity of at least 30% in accordance with X-ray diffraction.

6. A method according to claim 1 wherein said ethylene copolymer has a melt index within the range of 0.05 to 50 g/10 minutes.

7. A method according to claim 1 wherein said electrical conductor is a power cable.

8. A method according to claim 1 wherein said ethylene copolymer contains 0.01 to 0.7 mol % of a unit derived from said aromatic compound as a polymeric component.

9. A method according to claim 8 wherein said ethylene copolymer has a crystallinity of at least 30% in accordance with X-ray diffraction and a melt index within the range of 0.1 to 50 g/10 minutes and wherein said aromatic compound has 9 to 30 carbon atoms.

10. A method according to claim 9 wherein said melt index is 0.1 to 20 g/10 minutes.

11. An electrical conductor insulated with a material comprising of ethylene copolymer prepared by subjecting, to a high pressure radical polymerization, ethylene and an aromatic compound, at a polymerization pressure of 500 to 4,000 kg/cm$^2$ and a polymerization temperature of 50° to 400° C, said ethylene copolymer containing 0.005 to 1 mol % of a unit derived from said aromatic compound as a polymeric component, said aromatic compound selected from the group consisting of allyl benzene, phenylbutene, benzyl methacrylate, benzylacrylate, indene, beta-methyl styrene, phenylcyclohexene, methoxybetamethyl styrene, chlorophenyl cyclohexene, phenylvinyl ether, allylbiphenyl, diphenylethylene, phenyl styrylethane, diphenyl methylpentene, phenylbenzyl methacrylate, phenylbenzylacrylate, isopropenyl biphenyl, vinyl naphthalene, phenylisopropenyl phenylmethane and vinylanthracene.

12. An insulated electrical conductor according to claim 11 wherein said aromatic compound is an aromatic hydrocarbon.

13. An insulated electrical conductor according to claim 11 comprising an aromatic compound is selected from the group consisting of:
allyl benzene,
phenylbutene,
benzyl methacrylate,
benzylacrylate,
indene,
beta-methyl styrene,
phenylcyclohexene,
methoxybeta-methyl styrene,
chlorophenyl cyclohexene and
phenylvinyl ether.

14. An insulated electrical conductor according to claim 11 with a material comprising an automatic compound is selected from the group consisting of:
allylbiphenyl,
diphenylethylene,
phenyl styrylethane,
diphenyl methylpentene,
phenyl methylpentene,
phenylbenzyl methacrylate,
phenylbenzylacrylate,
isopropenyl biphenyl,
vinyl naphthalene,
phenylisopropenyl phenylmethane and
vinylanthracene.

15. An insulated electrical conductor according to claim 11 wherein said ethylene copolymer has a crystallinity of at least 30% in accordance with X-ray diffraction.

16. An insulated conductor according to claim 11 wherein said ethylene copolymer has a melt index within the range of 0.05 to 50 g/10 minutes.

17. An insulated conductor according to claim 11 wherein said electrical conductor is a power cable.

18. An insulated conductor according to claim 11 wherein said ethylene copolymer contains 0.01 to 0.7 mol % of a unit derived from said aromatic compound as a polymeric component.

19. An insulated conductor according to claim 1 wherein said ethylene copolymer has a crystallinity of at least 30% in accordance with X-ray diffraction and a melt index within the range of 0.1 to 50 g/10 minutes and wherein said aromatic compound has 9 to 30 carbon atoms.

20. An insulated conductor according to claim 19 wherein said melt index is 0.1 to 20 g/10 minutes.

* * * * *